Patented Nov. 9, 1948

2,453,644

UNITED STATES PATENT OFFICE 2,453,644

HOT MELT COATING COMPOSITION CONTAINING POLYETHYLENE, TERPENE RESIN, CHLORINATED DIPHENYL RESIN, AND PARAFFIN

Walter C. Steinkraus, Chicago, Ill.

No Drawing. Application December 6, 1945,
Serial No. 633,270

4 Claims. (Cl. 260—28.5)

My invention contemplates and provides a novel and superior composition wherewith webs of paper, regenerated cellulose, textile fabric, etc., may be coated by conventional or other suitable "hot-melt" technique.

In recent years the term "hot melt" has come to mean a material suitable for application, in the molten state, to suitable webs; in contradistinction to lacquers and varnishes which necessarily are compounded with solvents. The removal of solvents from the lacquer or varnish coatings of webs requires rather elaborate equipment and can be accomplished only with relative slowness. The equipment employed in hot-melt technique may be and usually is quite simple and, since the utilization of the hot melts presents no problem of solvent removal, the hot melts may be applied to webs more rapidly and satisfactorily than can lacquers or varnishes.

The composition of my present invention is a hot melt, within the meaning of this term as stated in the last preceding paragraph, which affords certain much needed and long sought but hitherto never attained combinations of practical advantages because of its inclusion, in appropriate proportions, of a polyethylene thermoplastic, paraffin, a hydrocarbon thermoplastic terpene resin and a chlorinated diphenyl resin. An optional additive to the aforementioned ingredients is polyisobutylene, sometimes called polymerized isobutylene.

A primary object of my invention is to provide a novel, practical and superior hot melt which includes a polythylene thermoplastic. Polyethylene thermoplastics are among the lightest of all plastics, having a specific gravity of 0.92 to 0.93 at 20° C. (68° F.).

The particular polyethylene thermoplastic which I very much prefer to include in my new hot melt is the plastic Polythene. A hydrocarbon thermoplastic terpene resin which I prefer to employ is the produce Piccolyte S–115. A chlorinated diphenyl resin suitable for my purpose is the product Aroclor 5460. I may employ either regular or microcrystalline paraffins having widely differing melting points, although I prefer to employ paraffins having melting points of approximately 57° C. to 58° C. (approximately 135° F. to 137° F.). However, on occasion I have successfully used micro-crystalline paraffins having melting points as high as approximately 77° C. to 79° C. (approximately 170° F. to 174° F.). When I optionally utilize polyisobutylene, it suitably may be the product Vistanex Polybutene B–10 to B–14 (formerly called Vistanex No. 6).

A hot melt according to my present invention should be compounded of the following ingredients in percentages, by weight, as follows:

Table 1

Polyethylene thermoplastic (suitably Polythene)—Not less than 10% and not more than 35%.

Hydrocarbon thermoplastic terpene resin (suitably Piccolyte S–115)—Not less than 5% and not more than 20%.

Chlorinated diphenyl resin (suitably Aroclor 5460)—Not less than 5% and not more than 50%.

Paraffin (either regular or micro-crystalline)—Not less than 5% and not more than 60%.

I have found it essential that the hot melt contain not less than five percent (5%) of either the hydrocarbon thermoplastic terpene resin or the chlorinated diphenyl resin. When only a very small percentage of the hydrocarbon thermoplastic terpene resin is present, there will be present a very substantial percentage of the chlorinated diphenyl resin; and similarly, when only a very small percentage of the chlorinated diphenyl resin is present, there will be present a very substantial percentage of the hydrocarbon thermoplastic terpene resin.

Hot melts compounded in accordance with and within the percentage limits of foregoing Table 1, desirably may be applied to webs of paper, regenerated cellulose, textile fabric, and the like, for the following reasons:

(a) As a decorative finish—characterized by high gloss if desired;

(b) For protection—i. e., to render the paper or other web water-proof and impervious to moisture, and, in some instances, to render the web alkali resistant when its ultimate use is to be in soap wrappers;

(c) To serve as laminating agents—or both as laminating agents and moisture-vapor barriers—as when two webs of paper are bonded together;

(d) To accord di-electric strength to paper webs ultimately to serve in the electrical field;

(e) To produce pressure-sensitive adhesives generally similar to the well-known Scotch tape.

Such hot melts can be compounded, as per such Table 1 and within the percentage limitations thereof, so as to be characterized by highly desirable combinations of the following advantages:

(1) The ability to maintain their light color, even when exposed to sunlight for protracted periods or when kept melted at operating temperatures for as much as sixteen hours;
(2) A glossy, tack-free finish;
(3) The ability to adhere to paper regardless of whether its surfaces be printed or blank;
(4) The ability to effect heat sealing;
(5) The ability to remain non-blocking at summer temperatures (by which is meant that two coated surfaces must not stick together at maximum summer temperatures while under two-pounds-per-square-inch pressure in a highly humid atmosphere;
(6) Toughness and resistance to abrasion, and a definite ability to resist smudging of its surface;
(7) Lack of odor or taste and non-toxic;
(8) Ability to resist blushing, i. e., to retain gloss, under high humidity conditions;
(9) Cheaply produced and runnable on existing coating machines at average speeds;
(10) Ability to resist substantial chemical or physical change, due to oxidization, polymerization, or evaporation, when subjected to average running temperatures;
(11) Grease proofness;
(12) Alkali resistance.

While various specifically different compositions, affording new and desirable combinations of the above listed advantages never before realized in a hot melt, may be compounded in accordance with and within the percentage limitations of the generic formula set forth in Table 1, the particular species of my invention which I presently prefer is one responding to the formula of Table 2:

Table 2

| | Per cent |
|---|---|
| Polyethylene thermoplastic (suitably Polythene) | About 20 |
| Hydrocarbon thermoplastic terpene resin (suitably Piccolyte S-115) | About 12 |
| Chlorinated diphenyl resin (suitably Aroclor 5460) | About 28 |
| Paraffin (either regular or micro-crystalline suitably having a melting point from about 135° F. to about 137° F.) | About 40 |

The runnability, blocking point, adhesion, ability to heat-seal, and gloss of this particular hot melt are extremely good, and it is definitely waterproof, alkali resistant, and free from tackiness.

Another desirable hot melt, embodying my present invention, may be compounded in accordance with Table 3:

Table 3

| | Per cent |
|---|---|
| Polyethylene thermoplastic (suitably Polythene) | About 20 |
| Hydrocarbon thermoplastic terpene resin (suitably Piccolyte S-115) | About 15 |
| Chlorinated diphenyl resin (suitably Aroclor 5460) | About 15 |
| Paraffin (either regular or micro-crystalline suitably having a melting point from about 135° F. to about 137° F.) | About 50 |

This hot melt is characterized by satisfactory runnability, medium gloss obtainable by quick chilling, lack of tackiness, good heat-sealing on many papers, and a blocking point somewhat lower than that of the hot melt of Table 2.

If, for the purpose of a particular web coating job, added tackiness is a desideratum in any hot melt embodying my invention, that added tackiness may be attained by introducing polyisobutylene. A relatively small addition of polyisobutylene, for example, one equal in weight to from about 5% to about 15% of the weight of the ingredients of a hot melt embodying my invention, usually will afford all of the tackiness required, and, frequently also will do that while somewhat improving the ultimate coating with respect to adhesion and ability to heat-seal.

Desirable hot melts which include the polyisobutylene may respond to the formula of either Table 4 or Table 5:

Table 4

| | Per cent |
|---|---|
| Polyethylene thermoplastic (suitably Polythene) | About 15 |
| Polyisobutylene (suitably Vistanex Polybutene B-10 to B-14) | About 5 |
| Hydrocarbon thermoplastic terpene resin (suitably Piccolyte S-115) | About 12 |
| Chlorinated diphenyl resin (suitably Aroclor 5460) | About 28 |
| Paraffin (suitably having a melting point from 135° F. to 137° F.) | About 40 |

Table 5

| | Per cent |
|---|---|
| Polyethylene thermoplastic (suitably Polythene) | About 20 |
| Polyisobutylene (suitably Vistanex Polybutene B-10 to B-14) | About 3 |
| Hydrocarbon thermoplastic terpene resin (suitably Piccolyte S-115) | About 11 |
| Chlorinated diphenyl resin (suitably Aroclor 5460) | About 27 |
| Paraffin (suitably having a melting point from 135° F. to 137° F.) | About 39 |

A hot melt prepared in accordance with Table 4 or Table 5 makes a good web coating when minimum tackiness and the ability to remain non-blocking are desiderata.

Due, inter alia, to its extraordinary overall-contraction when cooling from the molten state to room temperature, and its low thermal conductivity, Polythene, or other polyethylene thermoplastic per se is devoid of merit as a hot melt, but when compounded with the hereinbefore mentioned ingredients, as taught by the instant specification, it makes available a hot melt which I have ascertained to be outstandingly superior to all others for the great majority of web coating purposes.

Having thus described my invention, and having with particularity pointed out how I have been able to utilize polyethylene thermoplastic (e. g., Polythene) in satisfactory hot melts, what I claim as new and desire to secure by Letters Patent of the United States is:

1. A composition for coating webs by hot-melt technique which comprises the following four ingredients in substantially the following percentages, to-wit: polyethylene thermoplastic 20%, hydrocarbon thermoplastic terpene resin 12%, chlorinated diphenyl resin 28%, paraffin 40%.

2. A composition for coating webs by hot-melt technique which comprises the following four ingredients in substantially the following percentages, to wit: polyethylene thermoplastic 20%, hydrocarbon thermoplastic terpene resin 15%, chlorinated diphenyl resin 15%, paraffin 50%.

3. A composition for coating webs by hot-melt technique which comprises a major quantity of paraffin and minor quantities of a polyethylene thermoplastic, a hydrocarbon thermoplastic terpene resin, and a chlorinated diphenyl resin, the paraffin constituting not less than 40% of the whole, the polyethylene thermoplastic constituting substantially 20%, each of the aforesaid resins constituting not less than 5%, the hydrocarbon thermoplastic terpene resin constituting not more than 15%, and the chlorinated diphenyl resin constituting not more than 28%.

4. A composition for coating webs by hot-melt technique which comprises a major quantity of paraffin and minor quantities of a polyethylene thermoplastic, a hydrocarbon thermoplastic terpene resin, and a chlorinated diphenyl resin, each of the two resins constituting not less than 5% of the whole and the polyethylene thermoplastic constituting not less than 10% of the whole.

WALTER C. STEINKRAUS.

REFERENCES CITED

The following references are of record in the file of this patent:

UNITED STATES PATENTS

| Number | Name | Date |
|---|---|---|
| 2,212,155 | Ellis | Aug. 20, 1940 |
| 2,290,794 | Alvarado et al. | July 21, 1942 |
| 2,298,846 | Skooglund | Oct. 13, 1942 |